(No Model.) 2 Sheets—Sheet 1.

C. G. BAUMGAERTEL.
CLOSET.

No. 508,079. Patented Nov. 7, 1893.

Witnesses: Inventor:
Carl G. Baumgaertel
by his attorney (No Model.) 2 Sheets—Sheet 2.
C. G. BAUMGAERTEL.
CLOSET.
No. 508,079. Patented Nov. 7, 1893.
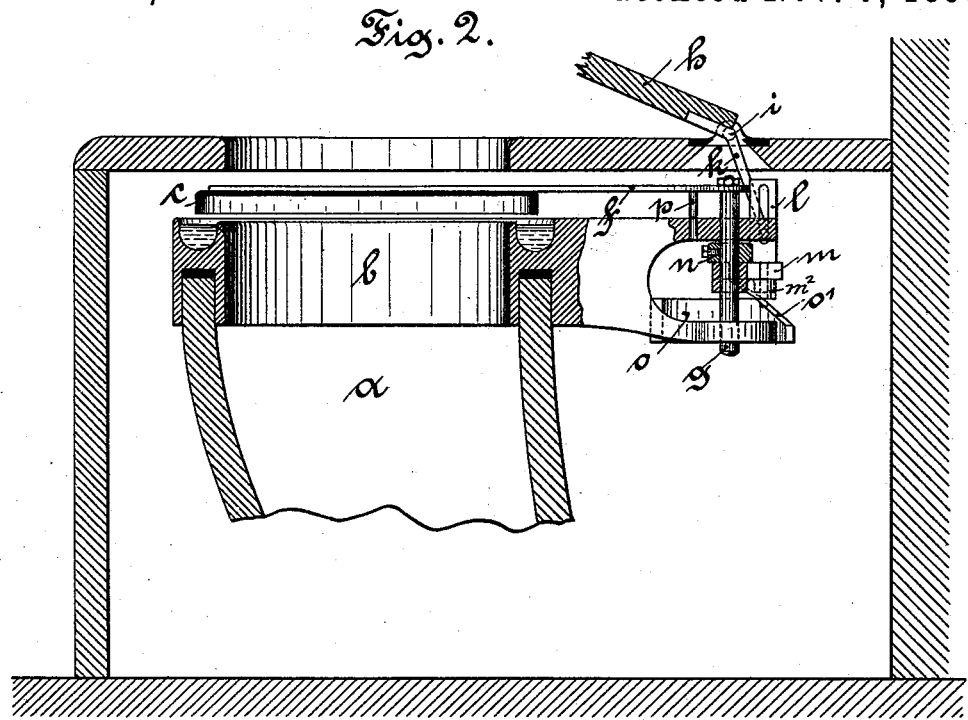
Fig. 2.
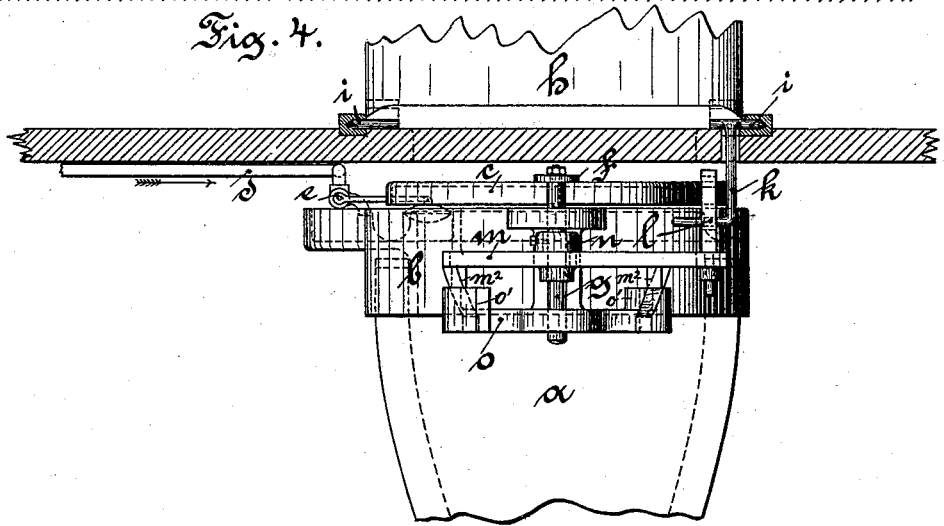
Fig. 4.
Fig. 5.
Witnesses:
Inventor:
Carl G. Baumgaertel
by his attorney

UNITED STATES PATENT OFFICE.

CARL GUSTAV BAUMGAERTEL, OF DRESDEN, GERMANY.

CLOSET.

SPECIFICATION forming part of Letters Patent No. 508,079, dated November 7, 1893.

Application filed June 28, 1893. Serial No. 479,005. (No model.)

*To all whom it may concern:*

Be it known that I, CARL GUSTAV BAUMGAERTEL, a subject of the King of Saxony, residing at Dresden-Altstadt, Saxony, German Empire, have invented certain new and useful Improvements in or Relating to Closets, of which the following is a specification.

The present improvement relates to that class of closets in which the rim or flange of a lid is adapted to enter a groove filled with water or in other words to be liquid-sealed.

The object of the invention is mainly to provide a mechanism for moving the said lid automatically and in conjunction with the opening and closing of the top flap or cover.

Figure 1:
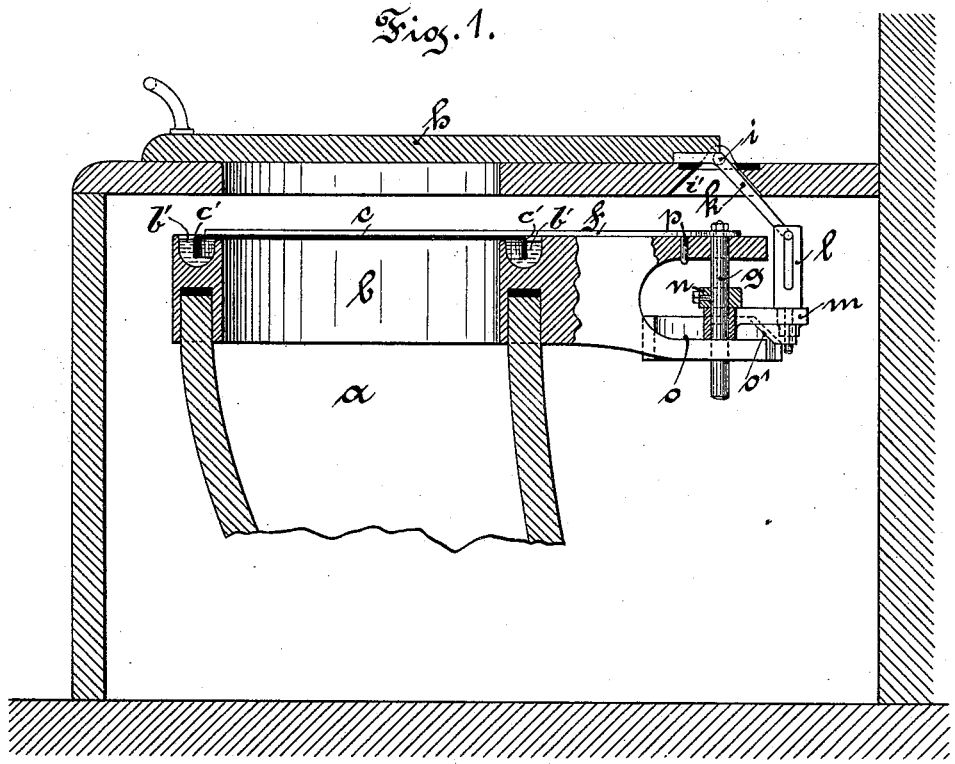
Figure 3:
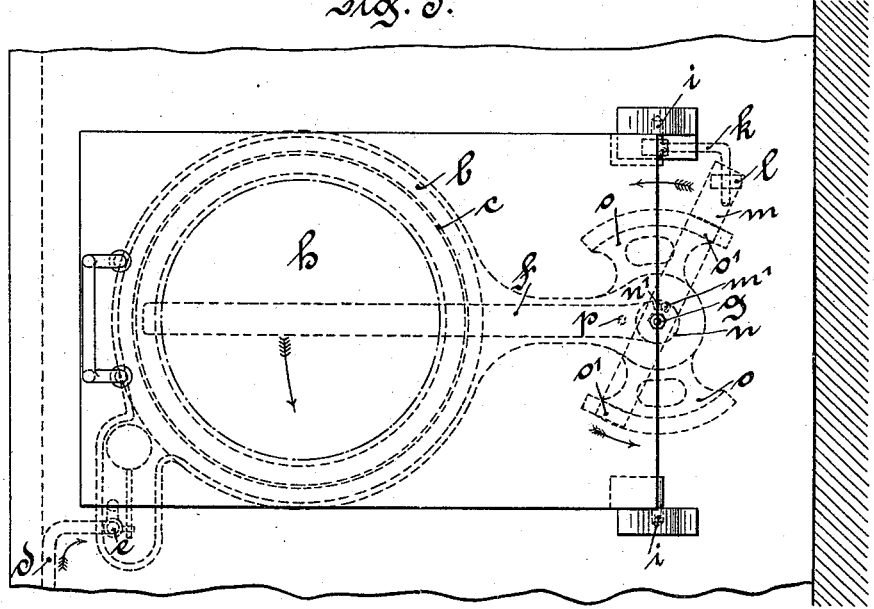

In the accompanying drawings Figure 1 is a vertical section through the seat and pan, showing the mechanism in its normal position. Fig. 2 is a similar view but with the flap or cover partly raised. Fig. 3 is a plan of Fig. 1. Fig. 4 is a sectional elevation of the mechanism in the position in which it is shown in Fig. 2, and Fig. 5 is a detail of the connection between the pivot of the lid and the lever for moving it.

The upper rim of the pan $a$ is provided with a grooved crown $b$ which instead of being attached to the pan as shown in the drawings may when desired, be made in one with it. The groove $b'$ filled with water or disinfecting liquid is intended to receive the downwardly projecting rim or flange $c'$ of the lid $c$. The rim may be made very thin relatively to the width of the groove so as to reduce to a minimum the consumption of water; but it may sometimes be advantageous to make the rim of the lid so as to nearly fit the groove and to eject each time a certain quantity of the liquid from the groove so as to rinse the interior of the pan. The groove is supplied with the liquid from a pipe $d$ in connection with a ball-valve $e$ of any known construction for automatically regulating the water level. The lid $c$ is attached to an arm $f$ rigidly connected to a vertical shaft $g$.

$h$ is the ordinary flap hinged at $i$ and serving to close the wooden seat at the same time causing the opening and the closing of the lid $c$ in the following manner:—One of the hinge pins $i$ carries a lever arm $k$ which passing through a slot $i'$ in the wooden seat extends downward and engages with the slot of a bar or arm $l$ pivoted or swiveled in the lever $m$ pivoted on the shaft $g$. The lever $m$ operates on a collar $n$ secured on shaft $g$ in such a manner as to allow said lever to be moved independently of the shaft $g$ within certain limits, but beyond which limits it moves the collar and shaft with it. To this end the collar $n$ is provided with a recess $n'$ Fig. 5 in which works a pin $m'$ fixed in or to the lever $m$ so as to allow the latter to move independently of the shaft $g$ until the pin $m'$ abuts against the end of the recess. The lever $m$ at its under side is provided with inclined surfaces $m^2$ corresponding with similar inclined surfaces $o'$ located on the frame $o$ these and the pin $m'$ and recess $n'$ being arranged in such a manner that when the lever $m$ slides over the inclined surfaces $o'$ the pin $m'$ moves independently of the collar $n$ in the recess $n'$ thereof. The effect obtained by this arrangement is that when the flap $h$ is being raised it causes the lever $m$ in consequence of the movement imparted to it through the medium of the lever arm $k$ engaging with the slotted bar $l$ to slide over the inclined surfaces $o'$ and lift the lid $c$ by pressing against the collar $n$ but without turning the shaft $g$. The lid $c$ is thus lifted out of the groove and meanwhile the pin $m'$ has reached the end of the recess and the further movement of the lever $m$ causes the shaft $g$ to turn with it thereby moving the lid $c$ sidewise, the reverse being the case when closing down the flap. The lid $c$ is still further guided by a pin $p$ engaging with a hole in the frame and otherwise sliding over the upper surface of the latter.

What I claim, and desire to secure by Letters Patent, is—

1. In a closet, the combination with the bowl provided at its upper edge with a groove, means for supplying a liquid to said groove, a lid provided with a flange adapted to fit within the groove, and a shaft to which the lid is rigidly connected, of a pivoted flap, a lever connected therewith, a second lever pivoted upon the shaft of the lid and provided with a slotted arm with which said first lever is loosely connected, inclined surfaces upon the under side of the said second lever, and adapted to engage with other fixed inclined surfaces a collar on the shaft of the lid and provided with a notch, and a pin or stud on the said second lever adapted to operate within said notch in the manner described, for the purpose specified.

2. In a closet, the combination with a suitable casing provided with a seat having an aperture, a bowl arranged within said casing and provided with a groove in its upper edge means for supplying a liquid to said groove, a lid provided with a flange adapted to fit within said groove, and a shaft to which said lid is rigidly connected, of a flap adapted to close the aperture of the seat, a lever extending through a slot in the latter and connected with the flap, a second lever pivotally connected with the shaft of the lid, an arm on the latter lever and provided with a slot in which the first lever pivotally engages, a frame or bearing carried by the bowl and provided with inclined surfaces, similar surfaces on the under side of the said second lever and adapted to engage with the surfaces on said frame, a collar on the shaft of the lid and provided with a notch, and a pin or stud on the second lever adapted to operate within said notch in the manner described, for the purpose specified.

In testimony whereof I have hereto set my hand in the presence of the two subscribing witnesses.

CARL GUSTAV BAUMGAERTEL.

Witnesses:
OTTO WOLFF,
HUGO DUMMER.